US012631213B2

(12) United States Patent

Nagarajan et al.

(10) Patent No.: US 12,631,213 B2

(45) Date of Patent: May 19, 2026

(54) WHEEL HUB BEARING UNIT WITH OPTIMIZED POSITIONING OF INBOARD ROLLERS

(71) Applicant: AKTIEBOLAGET SKF, Gothenburg (SE)

(72) Inventors: Lokesh Nagarajan, Northville, MI (US); Nicholas J Maslany, Brighton, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 192 days.

(21) Appl. No.: 18/521,020

(22) Filed: Nov. 28, 2023

(65) Prior Publication Data

US 2024/0191754 A1 Jun. 13, 2024

(30) Foreign Application Priority Data

Dec. 7, 2022 (IT) ........................ 102022000025152

(51) Int. Cl.
*F16C 19/49* (2006.01)
*F16C 33/58* (2006.01)

(52) U.S. Cl.
CPC .......... *F16C 19/497* (2013.01); *F16C 33/583* (2013.01); *F16C 2240/34* (2013.01); *F16C 2326/02* (2013.01)

(58) Field of Classification Search
CPC .......................... F16C 19/497; F16C 2326/02; F16C 2240/34; B60B 27/0005; B60B 27/001;

(Continued)

(56) References Cited

U.S. PATENT DOCUMENTS 7,104,695 B2 † 9/2006 Shevket
7,950,858 B2 † 5/2011 Norimatsu
(Continued)

FOREIGN PATENT DOCUMENTS

AU 2004311585 B2 11/2008
JP 2007303653 A † 11/2007
(Continued)

OTHER PUBLICATIONS

Written Opinion and Search Report from the Italian Patent Office mailed May 5, 2023 in related application No. IT 102022000025152, and translation thereof.

*Primary Examiner* — Alan B Waits
(74) *Attorney, Agent, or Firm* — J-TEK LAW PLLC; Scott T. Wakeman; Mark A. Ussai

(57) ABSTRACT

A wheel hub bearing unit includes a hub rotatable about an axis and having a flange connectable with a wheel, an inner ball raceway and an inner roller raceway. An outer ring is connectable with the vehicle and disposed about the hub and has an outer ball raceway and an outer roller raceway. A plurality of balls roll upon the inner and outer ball raceways and a plurality of tapered rollers roll upon the inner and outer roller raceways. A difference between a ball pitch circle radius and a roller midpoint circle radius is no greater than five millimeters. A vertex at the intersection of each line extending through the midpoint circle and a line extending through a midpoint of a spacing line segment is spaced from the axis by a radial distance, a ratio of the vertex radial distance to the midpoint circle radius is between 1.5 and 3.0.

10 Claims, 5 Drawing Sheets

(58) Field of Classification Search
CPC ............ B60B 2380/12; B60B 2380/14; B60B 2380/50
See application file for complete search history.

(56) References Cited

U.S. PATENT DOCUMENTS

| | | | | |
|---|---|---|---|---|
| 8,678,663 B2 * | 3/2014 | Ciulla | ................... | F16C 19/186 384/516 |
| 8,714,828 B2 † | 5/2014 | Ciulla | | |
| 10,369,840 B2 * | 8/2019 | Sguotti | ................ | F16D 3/2245 |
| 2005/0111771 A1 * | 5/2005 | Shevket | ................ | F16C 19/497 384/494 |
| 2007/0086687 A1 * | 4/2007 | Shevket | ................... | B60B 27/00 384/289 |
| 2008/0240635 A1 * | 10/2008 | Niebling | ............. | B60B 27/0005 384/416 |
| 2008/0310785 A1 * | 12/2008 | Niebling | ............... | F16C 19/185 384/548 |
| 2009/0003746 A1 | 1/2009 | Norimatsu et al. | | |
| 2009/0046972 A1 | 2/2009 | Umekida et al. | | |
| 2009/0116779 A1 * | 5/2009 | Komori | ................... | F16C 33/64 384/589 |
| 2011/0069919 A1 | 3/2011 | Umekida et al. | | |

FOREIGN PATENT DOCUMENTS

| | | | | |
|---|---|---|---|---|
| JP | 2008101651 A | † | 5/2008 | |
| WO | 2007052807 A1 | | 5/2007 | |

\* cited by examiner
† cited by third party

WHEEL HUB BEARING UNIT WITH OPTIMIZED POSITIONING OF INBOARD ROLLERS

CROSS-REFERENCE

This application claims priority to Italian patent application no. 102022000025152 filed on Dec. 7, 2022, the entire contents of which are fully incorporated herein by reference.

BACKGROUND OF THE INVENTION

The present invention relates to bearings, and more particularly to wheel hub bearing units.

Wheel hub bearing units are generally known in the bearing and automotive industries and are used to rotatably couple wheels to vehicles such as automobiles and trucks. A wheel hub bearing unit typically includes a cylindrical hub connectable with an axle, an outer ring disposed about the hub, and one or more rows or sets of rolling elements disposed between the hub and the outer ring. In certain constructions, the hub is rotatable about a central axis and includes a radial flange adapted to receive a wheel and the outer ring is fixedly connected with the vehicle, either to a steering knuckle or suspension component. In other configurations, the hub is mounted to a fixed shaft and the outer ring rotates about a central axis through the shaft and has a flange adapted to receive a wheel.

With either basic structure, the wheel hub bearing unit ordinarily includes two sets or rows of rolling elements, which may be balls, cylindrical rollers, tapered rollers, or any other appropriate type of rolling elements. When designing a wheel hub bearing unit for a specific application, consideration must be given to minimizing friction, providing sufficient structural rigidity to reliably support all anticipated loading, and reducing mass and space requirements for assembly into a vehicle.

SUMMARY OF THE INVENTION

The present invention is a wheel hub bearing unit for rotatably coupling a wheel with a vehicle, the wheel being rotatable about a central axis. The wheel hub bearing unit comprises a hub rotatable about the central axis and having an outboard axial end, an inboard axial end, an annular flange extending radially outwardly from the outboard end and configured to connect with the wheel. The hub has an outer circumferential groove providing an inner ball raceway and a frustoconical outer circumferential surface spaced axially from the outer circumferential groove and providing an inner roller raceway. An outer ring is configured to connect with the vehicle and is disposed about the hub, the outer ring having an inner circumferential groove providing an outer ball raceway and a frustoconical inner circumferential surface spaced axially from the inner circumferential groove and providing an outer roller raceway. The outer roller raceway has first and second axial ends and a midpoint circle centered between the first and second axial ends and extending about the central axis, the midpoint circle being spaced from the central axis by a midpoint circle radius. A plurality of balls is disposed between the hub and the outer ring so as to be rollable upon the inner ball raceway and the outer ball raceway to traverse a pitch circle extending through the center of each ball and about the central axis, the pitch circle having a radius. A plurality of tapered rollers is disposed between the hub and the outer ring so as to be rollable upon the inner roller raceway and the outer roller raceway. Further, the inner and outer ball raceways and the inner and outer roller raceways are configured such that a difference between the ball pitch circle radius and the midpoint circle radius is no greater than five millimeters (5 mm) and a vertex is defined at the intersection of each line extending through the midpoint circle perpendicular to the outer roller raceway and a line extending through the midpoint of and perpendicular to the spacing line segment. The vertex is spaced from the central axis by a radial spacing distance and a ratio of the vertex radial spacing distance to the midpoint circle radius is between 1.5 and 3.0.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
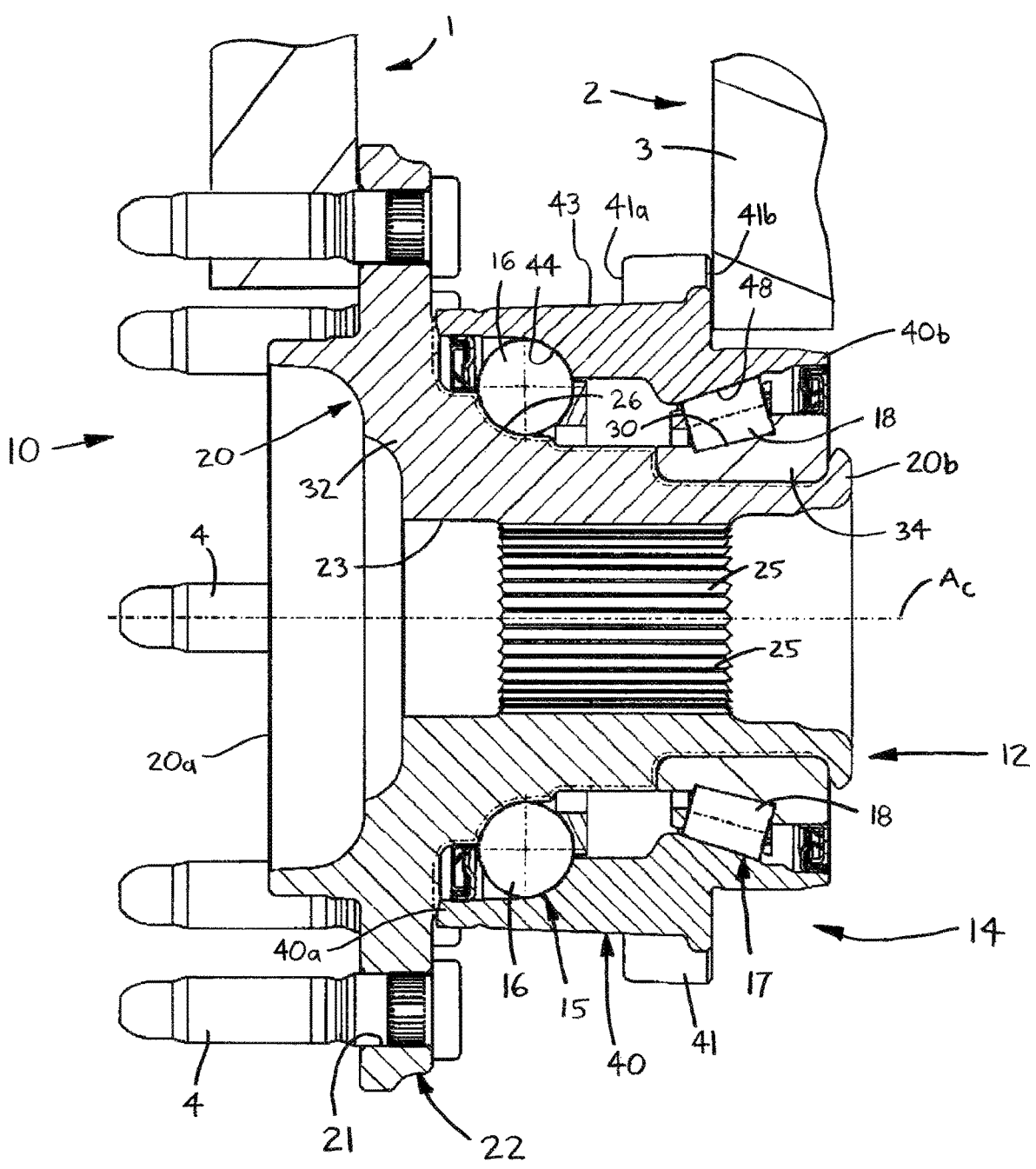
FIG. 1 is an axial cross-sectional view of a wheel hub bearing unit in accordance with the present invention, shown with broken-away, more diagrammatically depicted portions of a wheel and a vehicle.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-5 a wheel hub bearing unit 10 for rotatably coupling a wheel 1 with a vehicle 2, particularly a steering knuckle or a suspension component (either being indicated by the same reference element 3), the wheel 1 being rotatable about a central axis $A_C$. The wheel hub bearing unit 10 basically comprises a hub 12 rotatable about the central axis $A_C$, an outer ring 14 disposed about the hub 12, a plurality or "row" 15 of balls 16 disposed between the hub 12 and the outer ring 14 and a plurality or "row" 17 of tapered rollers 18 disposed between the hub 12 and the ring 14 and spaced axially from the plurality of balls 16, the balls 16 and the rollers 18 rotatably coupling the hub 12 with the outer ring 14. The hub 12 and the outer ring 14 are configured, i.e., constructed, assembled, etc., so as to position the rolling elements 16, 18 in locations which optimize the performance of the wheel hub bearing unit 10, as discussed in detail below.

Figure 2:
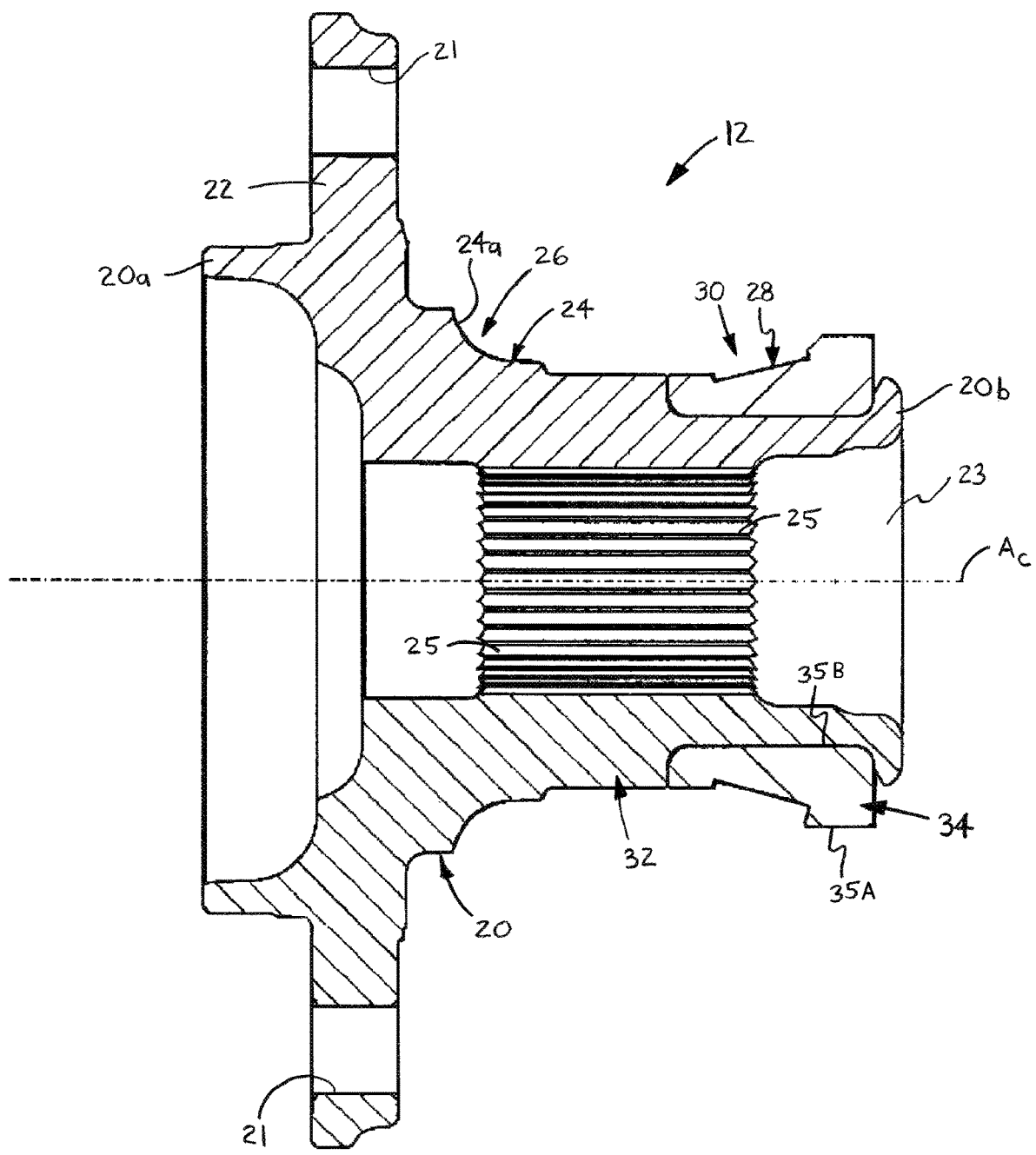
FIG. 2 is an axial cross-sectional view of an inner hub of the wheel hub bearing unit.

Referring to FIGS. 1 and 2, the hub 12 includes a generally cylindrical body 20 having an outboard axial end 20a, an opposing inboard axial end 20b and an annular flange 22 extending radially outwardly from the outboard end 20a. The hub flange 22 is configured to connect with the wheel 1, preferably by means of a plurality of fasteners 4 extending through holes 21 in the flange 22. The body 20 has an outer circumferential groove 24 providing an inner ball raceway 26 and a frustoconical outer circumferential surface 28 spaced axially from the outer circumferential groove 24 and providing an inner roller raceway 30. Preferably, the outer circumferential groove 24 has partially circular axial cross-sections and has a section 24a facing generally toward the inboard axial end 20b. Further, the frustoconical outer circumferential surface 28 preferably faces generally toward the outboard axial end 20a of the hub 12.

Further, the hub cylindrical body 20 also preferably includes a main body portion 32 and an annular ring 34 disposed about the main body portion 32 adjacent to the inboard axial end 20b. The annular ring 34 has an outer circumferential surface 35A including the outer frustoconical surface 28 providing the inner roller race 30 and an inner circumferential surface 35B providing a bore for receiving a section of the main body portion 32. However, the cylindrical body 20 may alternatively be formed as an integral body including the frustoconical surface 28 formed directly on the body 20. Furthermore, the hub body 20 preferably also has an inner circumferential surface 23 defining a bore for receiving an axle (not shown) and a plurality of axial splines 25 formed in the inner surface 23 for engaging with mating splines of the axle.

Figure 3:
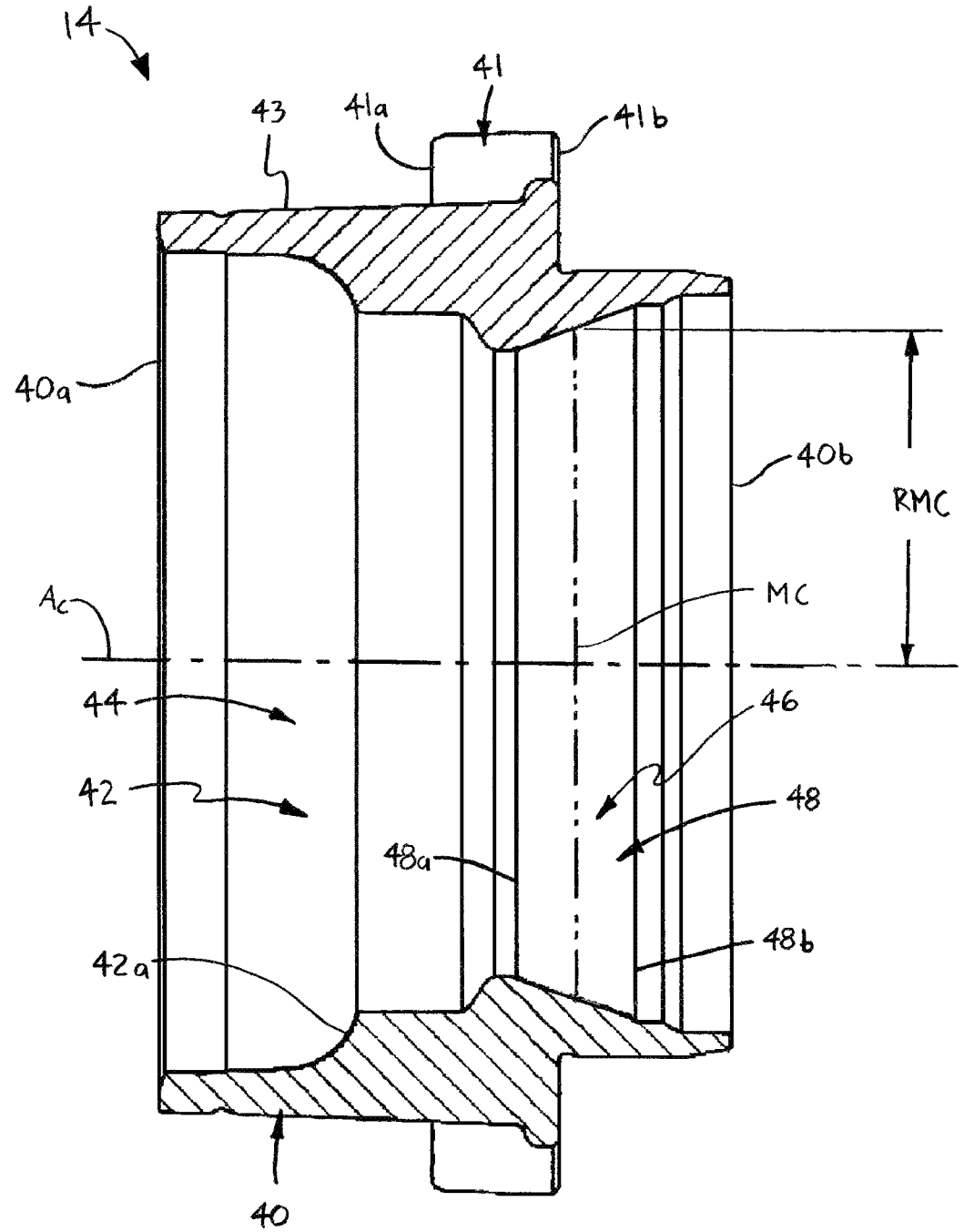
FIG. 3 is an axial cross-sectional view of an outer ring of the wheel hub bearing unit.

Referring now to FIGS. 1 and 3, the outer ring 14 is configured to connect with the vehicle 2, preferably with a steering knuckle or suspension component 3, and includes a generally circular cylindrical body 40 with an outboard axial end 40a and an opposing inboard axial end 40b. Most preferably, the outer ring body 40 has at least one flange 41 extending radially outwardly from the outer circumferential surface 43, the outer ring flange(s) 41 each having outer and inner axial ends 41a, 41b and being configured to connect with a steering knuckle/suspension component 3 by means of threaded fasteners (none shown). The outer ring cylindrical body 40 further has an inner circumferential groove 42 providing an outer ball raceway 44 and a frustoconical inner circumferential surface 46 spaced axially from the inner circumferential groove 42 and providing an outer roller raceway 48. When the outer ring 14 is disposed about the hub 12, the outboard end 40a of the ring 14 is disposed adjacent to the hub flange 22, the ring inboard end 40b is disposed adjacent to the hub inboard end 20b, the outer ball raceway 44 is disposed about the inner ball raceway 26 and the outer roller raceway 48 is disposed about the inner roller raceway 30.

Preferably, the inner circumferential groove 42 is spaced axially from, and has a section 42a facing generally toward, the ring outboard axial end 40a, and also facing toward the section 24a of the inner groove 24, and the frustoconical inner surface 46 is spaced axially from faces generally toward the ring inboard axial end 40b, and also faces toward the frustoconical outer surface 28. As such, the balls 16 and the rollers 18 are generally arranged in an O-type configuration when disposed on the raceway pairs 26, 44 and 30, 48, as is generally well known in the field of bearings. Further, the outer roller raceway 48 has first and second axial ends 48a, 48b and a midpoint circle MC centered between the first and second axial ends 48a, 48b. The midpoint circle MC is a theoretical construct which indicates the path traversed by the center $C_{LC}$ of the line of contact $LC_O$ (FIG. 4) of each roller 18 on the outer raceway 48 as the rollers 18 circulate about the central axis $A_C$, as best shown in FIG. 3 and discussed in further detail below. The midpoint circle MC extends about the central axis $A_C$ and is spaced therefrom by a midpoint circle radius RMC.

Figure 5:
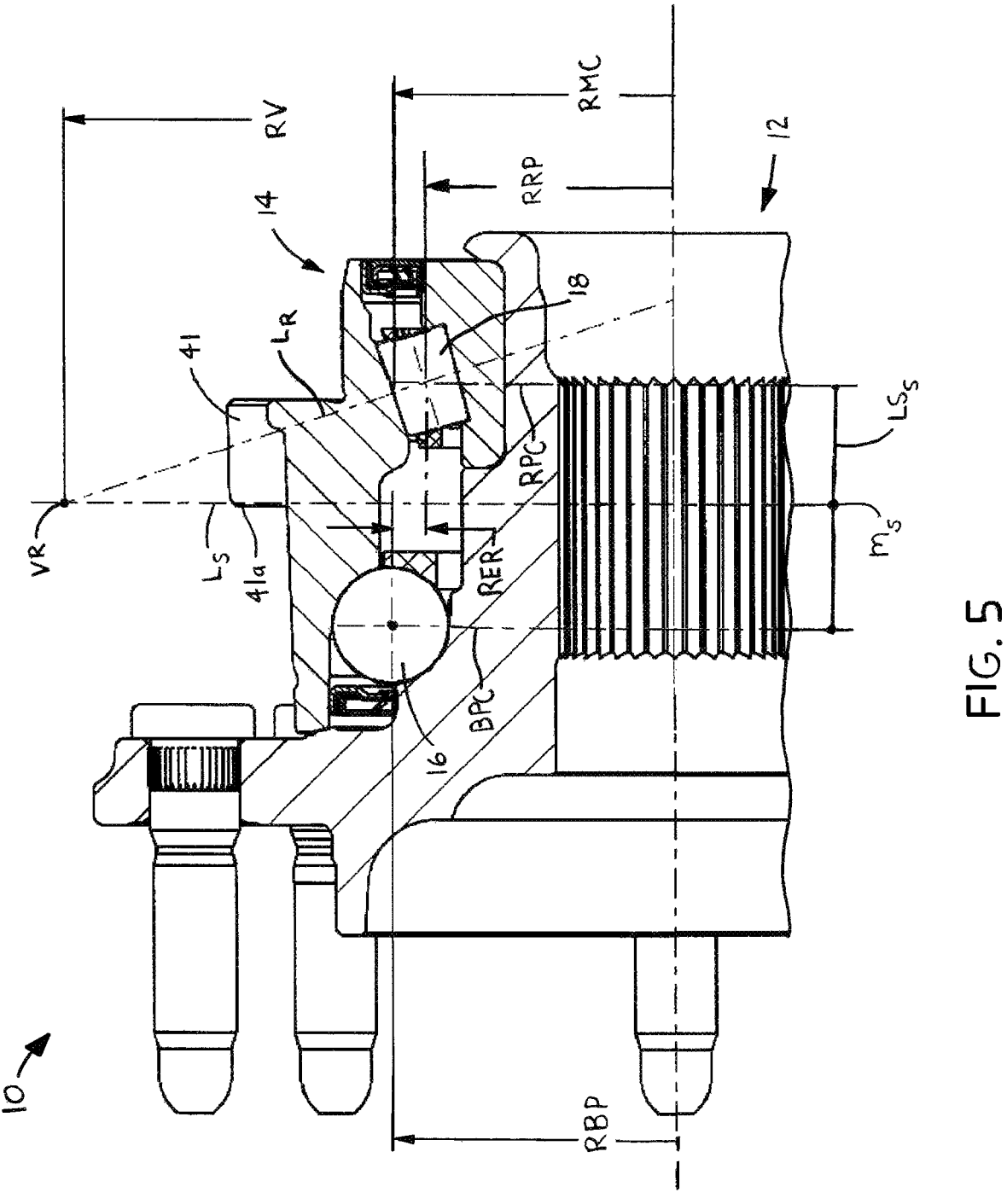
FIG. 5 is a broken-away, enlarged, axial cross-sectional view of an upper portion of the wheel hub bearing unit, including indications of a vertex defined by lines through a roller contact midpoint circle and a line through a midpoint of a spacing line segment and showing pitch circles of the balls and rollers.

As best shown in FIGS. 1 and 5, the plurality of balls 16 are disposed between the hub 12 and the outer ring 14 and are spaced circumferentially about the central axis $A_C$. The balls 16 are simultaneously rollable upon the inner ball raceway 26 and the outer ball raceway 44 when the hub 12 rotates about the central axis $A_C$. Specifically, during rotation of the hub 12, the balls 16 traverse a theoretical pitch circle BPC extending through the center of each ball 16 and about the central axis $A_C$, the pitch circle BPC having a radius RBP about the axis $A_C$.

Figure 4:
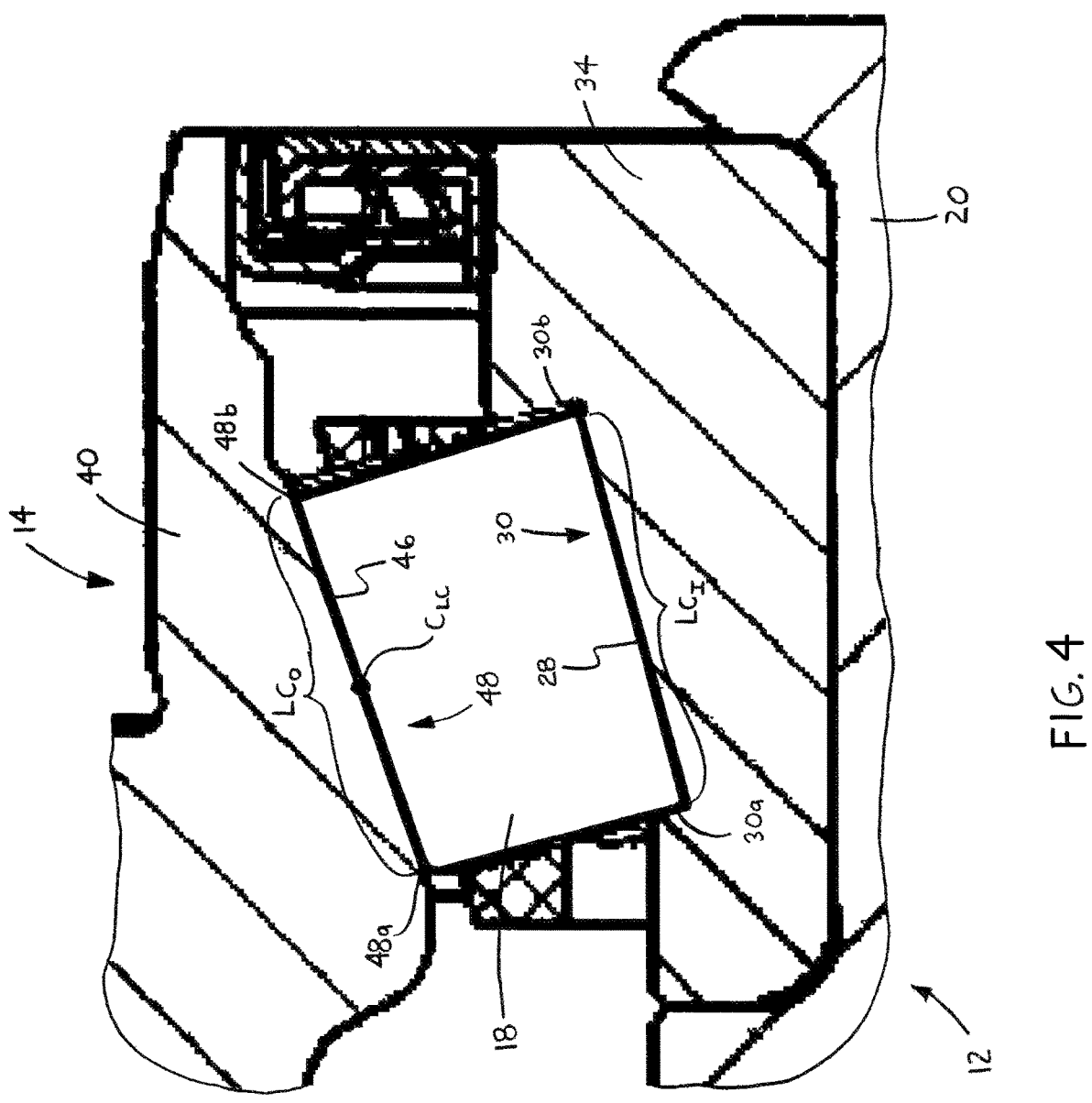
FIG. 4 is a more enlarged, broken-away axial cross-sectional view of one roller and portions of the roller raceways of the wheel hub bearing unit.

Further, the plurality of tapered rollers 18 are disposed between the hub 12 and the outer ring 14 and are spaced circumferentially about the central axis $A_C$. The rollers 18 are rollable simultaneously upon the inner roller raceway 30 and the outer roller raceway 48 to assist the balls 16 in rotatably coupling the hub 12 and the outer ring 14. As with the balls 16, the rollers 18 similarly traverse a theoretical pitch circle RPC through the geometric center of each roller 18, the roller pitch circle RPC having a radius RRP about the central axis $A_C$ and the roller pitch circle RPC being axially spaced from the ball pitch circle BPC by a spacing line segment $LS_S$ along the central axis $A_C$. As discussed above, each roller simultaneously contacts the outer raceway 48 along a contact line $LC_O$ extending axially between the axial ends 48a, 48b of the raceway 48, as well as contacting the inner raceway 30 along a contact line $LC_I$ extending axially between the axial ends 30a, 30b of the raceway 30, as indicated in FIG. 4.

Referring specifically to FIG. 5, to optimize the performance of the wheel hub bearing unit 10, the hub 12 and the outer ring 14 are formed or constructed to position the rollers 18 in a manner that has been determined to best balance considerations of friction on the rolling elements 16, 18 and the stiffness, mass and fatigue life of the wheel hub bearing unit 10. Specifically, the inner and outer ball raceways 26, 44 and the inner and outer roller raceways 30, 48 are configured such that a difference between the ball pitch circle radius RBP and the midpoint circle radius RMC, the "rolling element radius differential" or "RER differential" is between plus or minus five millimeters ($+/-5.0$ mm), i.e., no greater than five millimeters (5.0 mm). Additionally, the raceways 26, 44, 30 and 48 are also configured such that a vertex VR is defined at the intersection of each line $L_R$ extending through the midpoint circle MC perpendicular to the outer roller raceway 48 and a line $L_S$ extending through the midpoint $m_S$ of, and perpendicular to, the spacing line segment $LS_S$, the vertex VR being spaced from the central axis $A_C$ by a radial spacing distance RV and a ratio of the vertex radial spacing distance RV to the midpoint circle radius RMC, i.e., RV:RMC, the "vertex-roller radius ratio" or "VRR ratio", is between one and one-half (1.5) and three (3.0).

With such a relative positioning of the rolling elements 16, 18 and particularly the angular orientation of the rollers 18, the stiffness of the bearing assembly 10 is relatively greater and both friction and mass is relatively less when the RER differential is more proximal to negative five millimeters (−5 mm), indicating the rollers 18 are spaced radially inwardly from the balls 16, and the VRR ratio is more proximal to 1.5, indicating a shallower contact angle of the rollers 18. Alternatively, the bearing assembly stiffness is relatively less and friction and mass are relatively greater when the RER differential is more proximal to positive 5.0 millimeters (+5.0 mm) and the VRR ratio is more proximal to 3.0, indicating a steeper contact angle of the rollers 18. However, less improvement of the product life or fatigue life of the wheel hub bearing unit 10 has been observed when both the RER differential is more proximal to −5.0 mm and the VRR ratio is more proximal to 1.5 and conversely, greater improvement in the product/fatigue life has been observed when both the RER differential is more proximal to +5 mm and the VRR ratio is more proximal to 3.0. In any case, any combination of the RER differential within the range of plus or minus 5 millimeters (+/−5 mm) and a VRR of between 1.5 and 3.0 gives the wheel hub bearing unit 10 a beneficial combination of stiffness, mass, friction and product life.

Still referring to FIG. 5, preferably, the outer axial end 41a of the outer ring flange 41 is located proximal to any line $L_S$ extending perpendicularly through the midpoint $m_S$ of the spacing line segment $LS_S$, with the inner axial end 41b being disposed between the flange outer axial end 41a and the inboard end 40b of the outer ring 14. Such a positioning of the outer ring flange(s) 41 reduces deflections in the wheel hub bearing unit 10 for a given bending moment exerted on each flange 41.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A wheel hub bearing unit for rotatably coupling a wheel with a vehicle, the wheel being rotatable about a central axis, the wheel hub bearing unit comprising:

a hub rotatable about the central axis and having an outboard axial end, an inboard axial end, an annular flange extending radially outwardly from the outboard end and configured to connect with the wheel, an outer circumferential groove providing an inner ball raceway and a frustoconical outer circumferential surface spaced axially from the outer circumferential groove and providing an inner roller raceway;

an outer ring configured to connect with the vehicle and disposed about the hub, the outer ring having an inner circumferential groove providing an outer ball raceway and a frustoconical inner circumferential surface spaced axially from the inner circumferential groove and providing an outer roller raceway, the outer roller raceway having first and second axial ends and a midpoint circle centered between the first and second axial ends and extending about the central axis, the midpoint circle being spaced from the central axis by a midpoint circle radius;

a plurality of balls disposed between the hub and the outer ring so as to be rollable upon the inner ball raceway and the outer ball raceway to traverse a pitch circle extending through the center of each ball and about the central axis, the pitch circle having a pitch circle radius, the midpoint circle of the rollers being axially spaced from the pitch circle of the balls by a spacing line segment along the central axis; and a plurality of tapered rollers disposed between the hub and the outer ring so as to be rollable upon the inner roller raceway and the outer roller raceway;

wherein the inner and outer ball raceways and the inner and outer roller raceways are configured such that a difference between the pitch circle radius and the midpoint circle radius is no greater than five millimeters (5 mm) and a vertex is defined at the intersection of each line extending through the midpoint circle perpendicular to the outer roller raceway and a line extending through the midpoint of and perpendicular to the spacing line segment, the vertex being spaced from the central axis by a vertex radial spacing distance and a ratio of the vertex radial spacing distance to the midpoint circle radius is between 1.5 and 3.0.

2. The wheel hub bearing unit as recited in claim 1, wherein:

the outer circumferential groove of the hub has a section facing toward the inboard axial end and the frustoconical outer circumferential surface of the hub faces toward the outboard axial end; and the outer ring has an outboard axial end and an inboard axial end, the outboard axial end of the outer ring being disposed adjacent to the hub flange, the inner circumferential groove of the outer ring being spaced axially from and having a section facing toward the outboard axial end and the frustoconical inner surface of the outer ring is spaced axially from faces toward the inboard axial end.

3. The wheel hub bearing unit as recited in claim 1, wherein the hub has a cylindrical main body portion and an annular ring disposed about the main body portion adjacent to the inboard axial end, the annular ring having an outer circumferential surface including the outer frustoconical surface providing the inner roller race.

4. The wheel hub bearing unit as recited in claim 1, wherein the outer ring has an outer circumferential surface and a flange extending radially outwardly from the outer circumferential surface, the outer ring flange being configured to connect with a steering knuckle or a suspension member of the vehicle.

5. The wheel hub bearing unit as recited in claim 4, wherein the flange of the outer ring has outer and inner axial ends, the outer axial end of the flange being located adjacent to any line extending through the midpoint of the spacing line segment and perpendicular to the spacing line segment, the inner axial end being disposed between the outer axial end and the inboard end of the outer ring.

6. A wheel hub bearing unit for rotatably coupling a wheel with a vehicle, the wheel being rotatable about a central axis, the wheel hub bearing unit comprising:

a hub rotatable about the central axis and having an outboard axial end, an inboard axial end, an annular flange extending radially outwardly from the outboard end and configured to connect with the wheel, an outer circumferential groove providing an inner ball raceway and a frustoconical outer circumferential surface spaced axially from the outer circumferential groove and providing an inner roller raceway;

an outer ring configured to connect with the vehicle and disposed about the hub, the outer ring having an inner circumferential groove providing an outer ball raceway and a frustoconical inner circumferential surface spaced axially from the inner circumferential groove and providing an outer roller raceway, the outer roller raceway having first and second axial ends and a midpoint circle centered between the first and second axial ends and extending about the central axis, the midpoint circle being spaced from the central axis by a midpoint circle radius;

a plurality of balls disposed between the hub and the outer ring so as to be rollable upon the inner ball raceway and the outer ball raceway to traverse a pitch circle extending through the center of each ball and about the central axis, the pitch circle having a radius, the midpoint circle of the rollers being axially spaced from the pitch circle of the balls by a spacing line segment along the central axis; and a plurality of tapered rollers disposed between the hub and the outer ring so as to be rollable upon the inner roller raceway and the outer roller raceway;

wherein the inner and outer roller raceways are configured such that a vertex is defined at the intersection of each line extending through the midpoint circle perpendicular to the outer roller raceway and a line extending through the midpoint of and perpendicular to the spacing line segment, the vertex being spaced from the central axis by a vertex radial spacing distance and a ratio of the vertex radial spacing distance to the midpoint circle radius is between 1.5 and 3.0.

7. The wheel hub bearing unit as recited in claim 6, wherein:

the outer circumferential groove of the hub has a section facing toward the inboard axial end and the frustoconical outer circumferential surface of the hub faces toward the outboard axial end; and the outer ring has an outboard axial end and an inboard axial end, the outboard axial end of the outer ring being disposed adjacent to the hub flange, the inner circumferential groove of the outer ring being spaced axially from and having a section facing toward the outboard axial end and the frustoconical inner surface of the outer ring is spaced axially from faces toward the inboard axial end.

8. The wheel hub bearing unit as recited in claim 6, wherein the hub has a cylindrical main body portion and an annular ring disposed about the main body portion adjacent to the inboard axial end, the annular ring having an outer circumferential surface including the outer frustoconical surface providing the inner roller race.

9. The wheel hub bearing unit as recited in claim 6, wherein the outer ring has an outer circumferential surface and a flange extending radially outwardly from the outer circumferential surface, the outer ring flange being configured to connect with a steering knuckle or a suspension member of the vehicle.

10. The wheel hub bearing unit as recited in claim 9, wherein the flange of the outer ring has outer and inner axial ends, the outer axial end of the flange being located adjacent to any line extending through the midpoint of the spacing line segment and perpendicular to the spacing line segment, the inner axial end being disposed between the outer axial end and the inboard end of the outer ring.

* * * * *